W. H. A. BROWN.
BOTTLE STOPPER OR CLOSURE.
APPLICATION FILED NOV. 12, 1921.
1,436,645.
Patented Nov. 28, 1922.
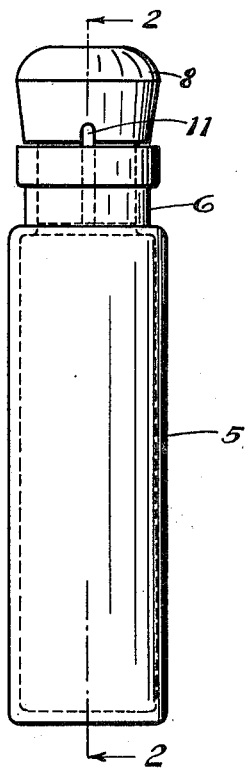
Fig.1
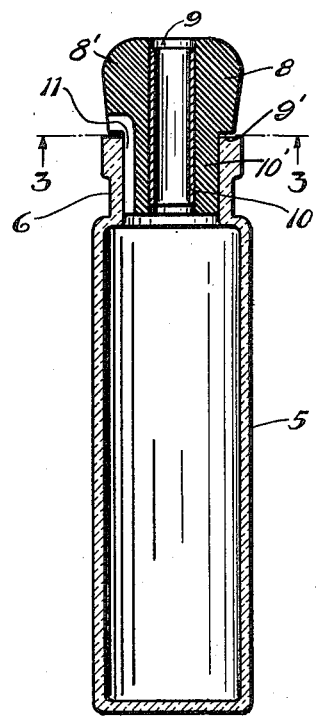
Fig.2
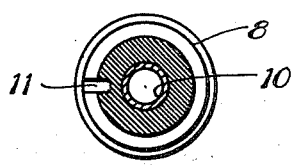
Fig.3
Witnesses:
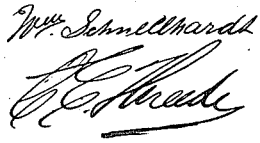
Inventor
William H. A. Brown
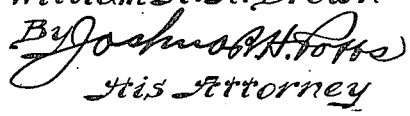
His Attorney Patented Nov. 28, 1922.

1,436,645

UNITED STATES PATENT OFFICE.

WILLIAM H. A. BROWN, OF CHICAGO, ILLINOIS, ASSIGNOR TO JOHN H. BENTLEY, OF CHICAGO, ILLINOIS.

BOTTLE STOPPER OR CLOSURE.

Application filed November 12, 1921. Serial No. 514,651.

*To all whom it may concern:*

Be it known that I, WILLIAM H. A. BROWN, a citizen of the United States, and a resident of the city of Chicago, county of Cook, and State of Illinois, have invented certain new and useful Improvements in Bottle Stoppers or Closures, of which the following is a specification.

My invention relates to new and useful improvements in bottle stoppers or closures, and has for its principal object the provision of an improved construction of this character which will be highly efficient in use.

A further object of my invention is the provision of an improved stopper of this character whereby atmospheric air can be conveniently admitted into the body of a bottle so as to greatly facilitate the discharge of the contents therein.

Other objects will appear hereinafter.

The invention consists in the combinations and arrangements of parts hereinafter described and claimed.

The invention will be best understood by reference to the accompanying drawings forming a part of this specification, and in which, Fig. 1 is an elevational view of the invention, Fig. 2 is a sectional detail view of the same, taken substantially on line 2—2 of Fig. 1, and Fig. 3 is a sectional detail view of the same, taken substantially on line 3—3 of Fig. 2.

The preferred form of construction as illustrated in the drawing comprises a bottle 5, of any approved type, having the usual open neck 6. Removably positioned in the mouth of the bottle-neck 6, is a stopper 8 having a central passage 9 therethrough, said passage being preferably lined with a removable cylindrical lining 10, as shown, arranged to prevent the contents of the bottle from contacting with the walls of the passage 9. As shown, the stopper 8 is provided with an enlarged portion 8', the sides of which project beyond the sides of the lower portion 10' of the stopper forming an annular shoulder 9' adapted to rest upon the top edge of the neck 6 of the bottle 5. The lining is preferably formed of celluloid or any other suitable waterproof material having a smooth finish which will afford a smooth passage. The bottle shown in the drawing is comparatively a small bottle such as is used for the bottling of medical compounds, perfumes or the like, however, the bottle may be of any size or shape.

As illustrated in the drawing, I provide means whereby atmospheric air can be readily admitted into the bottle so as to create a direct air circulation which will greatly facilitate the discharging of the contents from the bottle, as will be readily understood. This means comprises a recess 11 formed in the side of the stopper 8, extending from the inner end thereof and terminating midway between the top of the stopper and the bottom thereof, or to a point just above the edge of the bottle neck, this arrangement being such that the neck of the bottle will cover the greater portion of the recess, leaving only a small portion exposed, as shown.

The bottle illustrated in the drawing is of the character such as is used for containing smelling salts, headache powder, or the like. In a bottle of this character, my improved stopper will be of great advantage, inasmuch as when the bottle is applied to the nostril of the user, the fumes emitted from the salts or the like will be forced through the central passage of the stopper by the atmospheric air entering the bottle through the recess or passage 11. It will be thus seen that when applying the bottle to the nostril to inhale the fumes discharged from the contents therein to clear the nostrils, the user need only inhale a little in order to draw the fumes from the bottle into the nostrils. As the air passes into the bottle, it creates a circulation which will force the fumes rapidly through the passage into the nostrils. My improved stopper will also be of great advantage when used in connection with bottles used for bottling liquid, for example, a beverage, for in pouring out the beverage, the air passing into the bottle will greatly facilitate the discharge of the beverage from the bottle.

When the bottle is not in use, an outer air-tight closure member or cap (not shown) of any approved type, can be positioned around the neck of the bottle, thereby sealing the bottle air-tight.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention, what I claim as new and desire to secure by Letters Patent is:

The combination with a bottle, of a stopper positioned in the mouth thereof, the upper portion of said stopper being enlarged and adapted to rest on the edge of the neck of said bottle; a central passage formed in said stopper, there being a cylindrical lining arranged in said passage; and a recess formed in the side of the lower portion of said stopper and the lower end of the enlarged portion thereof for the admission of air into said bottle; said recess extending upwardly from the inner end of said stopper and terminating above the edge of the neck of said bottle whereby only the portion of the recess formed in the enlarged portion of said stopper is exposed for such admission of air into said bottle.

In testimony whereof I have signed my name to this specification in the presence of two subscribing witnesses.

WILLIAM H. A. BROWN.

Witnesses:
  JOSHUA R. H. POTTS,
  CLARENCE E. THREEDY.